United States Patent [19]

Herrington

[11] Patent Number: 4,619,459

[45] Date of Patent: Oct. 28, 1986

[54] CYLINDER HEAD GASKETS WITH APERTURE REINFORCING MEANS

[75] Inventor: Maurice G. Herrington, Furnham Common, England

[73] Assignee: Payen International Limited, Berkshire, England

[21] Appl. No.: 678,758

[22] Filed: Dec. 5, 1984

[30] Foreign Application Priority Data

Dec. 8, 1983 [GB] United Kingdom ............... 8332855

[51] Int. Cl.⁴ .............................................. F16J 15/12
[52] U.S. Cl. .................. 277/235 B; 277/233
[58] Field of Search .............. 277/235 B, 166, 229, 277/233, 234, 236, 235 R, 235 A

[56] References Cited

U.S. PATENT DOCUMENTS 1,846,402  2/1932  Oven ................................ 277/235 B
4,317,576  3/1982  Barker et al. ................... 277/235 B

FOREIGN PATENT DOCUMENTS 1260236  1/1972  United Kingdom ............ 277/235 B

Primary Examiner—Robert S. Ward
Attorney, Agent, or Firm—Nixon & Vanderhye

[57] ABSTRACT

A gasket comprises a flat body portion having two gasket facings and an inner reinforcing core, the gasket having an aperture defined therein, said aperture being provided with secondary sealing means comprising flat annuli located on opposite faces of the body portion in those regions there of surrounding and adjacent the aperture, the annuli extending into the aperture to provide annular primary sealing means radially inwardly of the margin of the aperture, and is characterized in that one of said annuli is folded around radially outwardly of the aperture to at least partially enclose, locate and retain a primary sealing ring radially inwardly of and relative to the margin of the aperture, said primary sealing ring comprising marginal portions of both of said annuli and co-operating portion of said reinforcing core which projects radially inwardly of the aperture from flat body portion.

3 Claims, 2 Drawing Figures

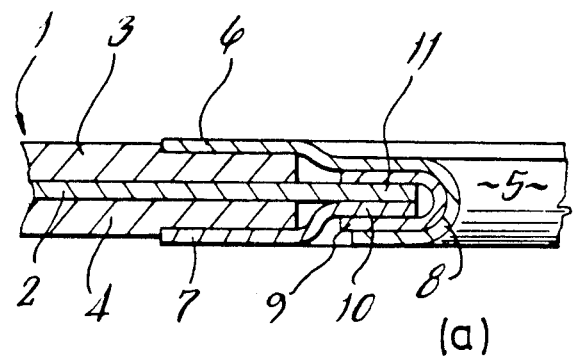
(a)
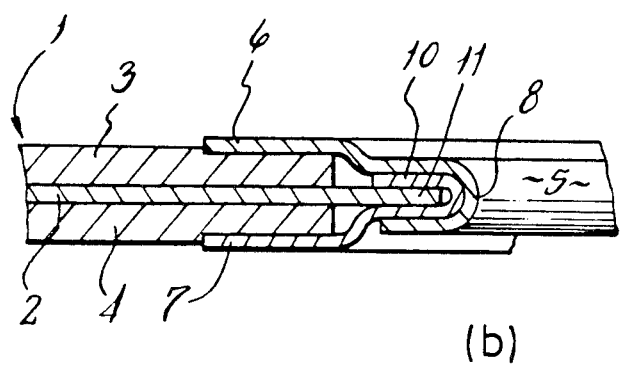
(b)

CYLINDER HEAD GASKETS WITH APERTURE REINFORCING MEANS

FIELD OF THE INVENTION

This invention relates to gaskets and in particular but not exclusively, to cylinder head gaskets for use in internal combustion engines. Such gaskets usually comprise a body portion having apertures formed therein and reinforcing and/or supporting means for the margins of these apertures.

THE PRIOR ART

The specification of British Patent GB No. 1260236 discloses a gasket construction in which at least one aperture is fitted with a two-part reinforcement, the purpose of which is to create a two-stage, primary and secondary seal around the margin of the aperture, with the secondary seal radially outermost. Where the aperture is for the combustion chamber of an internal combustion engine, the construction enables the use of an all-metal primary seal backed up by a secondary seal in which both the secondary sealing element and the gasket body material are to a large extent protected from the effects of heat and pressure in the combustion chamber.

OBJECT OF THE INVENTION

Under some circumstances the primary and secondary sealing arrangement disclosed in GB No. 1260236 is not ideal because it does not always give entirely satisfactory combustion gas sealing. For example, when fitted to a high speed diesel engine having combustion chambers in the cylinder head, there is a potential line or weakness along the circumferential line of contact between the two seals. It is an object of the present invention to minimize this risk of gas leakage.

BRIEF DESCRIPTION OF THE DRAWINGS

FIGS. (a) and (b) are cross-sectional side view of part of a gasket constructed in accordance with the present invention.

BRIEF DESCRIPTION OF THE INVENTION

According to the present invention, a gasket comprises a flat body portion comprising two gasket facings and an inner reinforcing core, the gasket having an aperture defined therein, said aperture being provided with secondary sealing means comprising flat annuli located on opposite faces of the body portion in those regions there of surrounding and adjacent the aperture, the annuli extending into the aperture to provide annular primary sealing means radially inwardly of the margin of the aperture, characterised in that one of said annuli is folded around radially outwardly of the aperture to at least partially enclose, locate and retain a primary sealing ring radially inwardly of and relative to the margin of the aperture, said primary sealing ring comprising marginal portions of both of said annuli and a co-operating portion of said reinforcing core which projects radially inwardly of the aperture from said flat body portion.

PREFERRED OPTIONAL FEATURES OF THE INVENTION

Preferably, the other of said annuli extends into the folded-around portion of the one annulus to form at least part of the primary sealing ring and is itself folded around the margin of the core portion which projects into the apeture. The two primary sealing ring may however include a U-section metal eyelet, with the arms of the U facing radially outwardly of the aperture. The reinforcing core may be of plain or pierced metal sheet.

The U-section metal eyelet, if used, preferably encloses both the core and the margin of the other annulus which need not then be folded around the core. The precise configuration adopted will reflect the strength and thickness required in the primary sealing ring, providing a relatively simple way of adjusting the performance characteristics of the latter in service. It will be appreciated that the core itself is an essential integer of the invention.

Preferably, in service in an internal combustion engine, that face of the gasket on which the one annulus lies is used as the upper, cylinder head-contacting face, with the other face against the cylinder block. Because the upper face has no exposed circumferential seam or joint between it and the primary sealing ring, the risk of gas leakage from the combustion chamber is minimized. The other face is normally adequately protected and/or supported by the cylinder block; a circumferential seam/joint on that face represents a much lower and acceptable risk.

DESCRIPTION OF ILLUSTRATED EMBODIMENTS

In order that the invention be better understood two preferred embodiments of it will now be described with reference to the accompanying drawing in which:

FIG. (a) is a cross-sectional side view of part of a gasket constructed in accordance with the invention and FIG. (b) is a similar cross-sectional side view of a further gasket constructed in accordance with the invention.

For convenience, like parts bear like reference numerals in both figures.

Referring to both the figures a gasket body 1 comprises a plain steel core 2 and conventional non-metallic gasket facing layers 3, 4 respectively. An aperture 5 is provided, in this case for an internal combustion engine combustion chamber, (not shown). The aperture is provided with secondary sealing means comprised of metal annuli 6,7 on opposite faces of the gasket body 1 adjacent the aperture 5, together with a primary sealing ring constituted in part by a folded-around portion 8 or the annulus 6.

Referring now to FIG. (a) the primary sealing ring is constituted by a U-section eyelet 9 and the marginal portion 10 of the annulus 7, together with the folded-around protion 8 which serves to enclose the other parts. A portion 11 of the core 2 projects into the aperture 5, beyond facing layers 3, 4 and together with the abutted portion ot the annulus 7 and the eyelet 9 forms the inside of the primary sealing ring. The whole assembly is retained/located by the folded-around portion 8 of the annulus 6. FIG. (b) differs from (a) in that the folded back part 10 of annulus 7 is folded around a projecting portion 11 of the core 2.

In both cases it is preferred that in use, the annulus 6 lies against the cylinder head, towards the combustion chamber.

It will be understood that by selecting the internal construction of the primary sealing ring, the relative thicknesses of the annuli, the eyelet and core (if the core is in fact employed in making the primary sealing ring) it is possible to adjust the strength/resilience of the ring over a wide range, whilst retaining the features of two-stage sealing and excellent resistance to the effects of combustion chamber conditions in service.

I claim:

1. A gasket comprising a flat body portion comprising two gasket facings and an inner reinforcing core, the gasket having an aperture at the inner edge of the centrally located reinforcing core defined therein, said aperture being provided with secondary sealing means comprising flat annuli located on opposite faces of the body portion in those regions there of surrounding and adjacent the aperture, the annuli extending into the aperture to provide annular primary sealing means radially inwardly of the margin of the aperture, wherein one of said annuli is folded around radially outwardly of the aperture to at least partially enclose, locate and retain a primary sealing ring radially inwardly of and relative to the margin of the aperture, said primary sealing ring comprising marginal portions of both of said annuli and co-operating portion of said reinforcing core which projects radially inwardly of the aperture from said flat body portion.

2. The gasket of claim 1 in which the primary sealing ring comprises an eyelet folded round said inwardly projecting portion of the core and a marginal portion of the second said annuli, both said eyelet and said marginal portion being at least partly enclosed by the portion of the one annulus which is folded around radially outwardly of the aperture.

3. The gasket of claim 1 in which the primary sealing ring comprises an eyelet constituted by a marginal portion of the second of said annuli which is folded radially outwardly aroung the inner margin of the inwardly projecting portion of the core, said outwardly folded portion and the core portion being at least partly enclosed by that portion of the one annulus which is folded around radially outwardly of the aperture.

* * * * *